April 12, 1938.   D. H. MITCHELL   2,114,067
INDICATING AND CONTROL APPARATUS
Filed Dec. 14, 1936
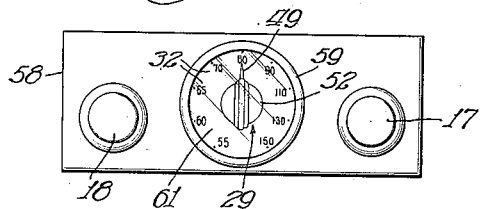
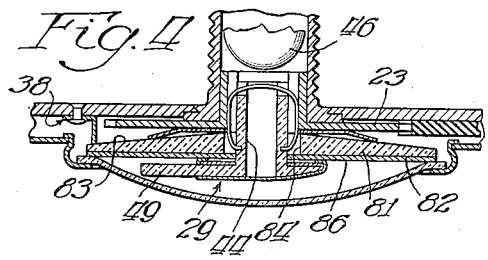
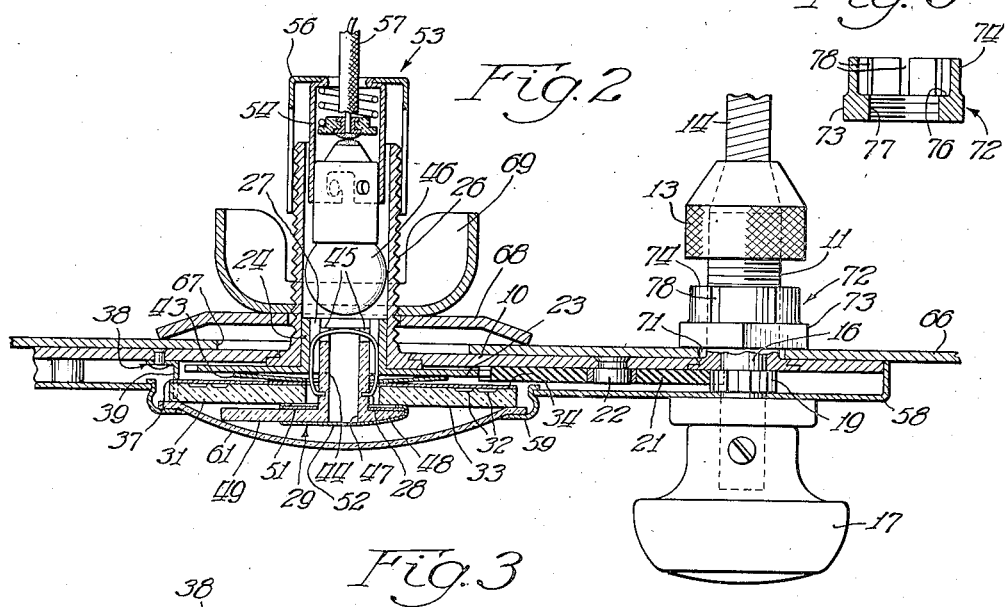
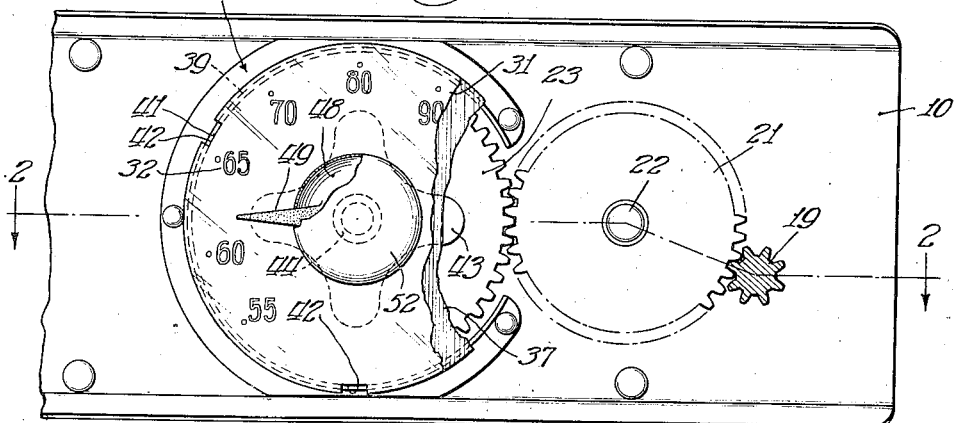
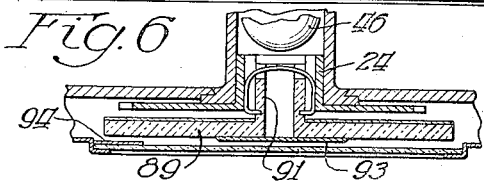
Inventor:
Donald H. Mitchell
By:
Foorman L. Mueller Atty.

Patented Apr. 12, 1938

2,114,067

UNITED STATES PATENT OFFICE 2,114,067

INDICATING AND CONTROL APPARATUS

Donald H. Mitchell, Chicago, Ill., assignor to Galvin Manufacturing Corporation, Chicago, Ill., a corporation of Illinois Application December 14, 1936, Serial No. 115,734

19 Claims. (Cl. 116—124.1)

My invention relates generally to control and indicating apparatus, and in some of its aspects is especially suitable for a control panel and indicating dial for an automobile radio receiver.

In addition to the problem of providing an attractive and simple control and indicating device, easily adaptable to different mounting conditions and capable of being quickly mounted when so adapted, one of the most difficult problems in the design of an automobile radio receiver is to illuminate the tuning dial in a proper manner. This illumination should be sufficient to light up the tuning scale and pointer, and yet be free from glare so as not to shine in the automobile driver's eyes and interfere with his vision of the road, or catch his eyes and divert his attention.

Various methods of diffusing the illumination for such a dial have been employed in an effort to overcome this difficulty, but in substantially all of these devices there has still been some objectionable glare. In addition, the structure for accomplishing the illumination of the dial, as well as the control apparatus and indicating apparatus in combination with the dial, has in general been so complicated as to increase the size and cost of the complete unit to a rather excessive amount and in some instances make the mounting of the unit difficult, and still without the desired illuminating effect. Each of these devices has generally been adapted to mounting only on a particular automobile dashboard or the like, and a different radio control panel was required for each automobile structure. This has necessitated additional work for the installer of the radio receiver in adapting the control panel to the automobile structure, or has necessitated carrying several types of control panels in stock for different makes of automobiles.

It is an object of my invention to provide an improved control and indicating apparatus.

A still further object is to provide such apparatus for an auto radio receiver.

Another object is to provide such apparatus in a compact and inexpensive, yet sturdy structure, which may be readily mounted on the instrument panel of an automobile, and is readily adapted to and mounted on various types of instrument panels with different placements for mounting apertures and the like.

A still further object is to provide control and indicating apparatus having illumination for the indicating apparatus which is diffused in such a manner as not to glare objectionably in the eyes of the operator or observer.

One of the features of the invention is the provision of a combination pointer and light diffuser for the indicating dial which diffuses the light satisfactorily over the tuning scale, and which light likewise illuminates the pointer so that it is readily visible as it is moved over the dial.

A further feature of the invention is the provision of operating mechanism, in control and indicating apparatus for an automobile radio receiver, which may be assembled in a very shallow space so that the panel including this mechanism may be mounted on the instrument panel of the automobile without causing any objectionable appearance thereto.

A related object of the invention is to make suitable provision for mounting this thin assembly quickly on various constructions of instrument panels.

Another feature is the provision of dial and illuminating structure wherein the pilot light is mounted centrally of the dial and projects its light into the center of the dial assembly to be diffused outwardly therefrom in all directions over the face of the dial.

Other objects and advantages of the invention will be apparent from the following description taken with the drawing, in which:

Fig. 1 is a front elevation of the assembled control and indicating panel.

Fig. 2 is a fragmentary sectional view of the panel of a commercial embodiment of the invention and taken approximately on the line 2—2 of Fig. 3.

Fig. 3 is a front elevation partly in section of the structure of Fig. 2, with the cover for the panel, control knobs and cover for the dial removed.

Fig. 4 is a fragmentary sectional view of a modification of the invention.

Fig. 5 is a cross-sectional view of the mounting nut shown in position in Fig. 2.

Fig. 6 is a fragmentary sectional view of a portion of a modified embodiment of the indicating apparatus assembly.

In practicing the invention, I employ a rear mounting plate 10 having an elongated threaded nipple 11 with a conical split outer end extending rearwardly therefrom and rigidly secured to the plate for receiving a flexible cable running to the radio receiver itself, and a knurled clamping nut 13 having a cone-shaped interior which tightens down on the end of the nipple 11 so as to squeeze such end against the casing 14 of the flexible cable to retain it against withdrawal or movement in the mounting nipple. An inner flexible driving cable 16 extends through the mounting nipple from the casing 14 and is appropriately connected with the control knob 17. A similar assembly is provided for a volume control and switch cable unit operated by control knob 18 and shown on the left hand side of the panel as illustrated in Fig. 1.

A pinion 19 is secured to the end of the shaft 16 and engages a gear 21 rotatably mounted on a stud 22 secured in the back 10 of the control panel. Both for ease and quietness of operation, a rubber gear 21 may be employed. It is preferably made large enough and with teeth thick enough to engage the main driving gear 23 and pinion 19 of metal with a snug fit or a compressed fit, to take up production tolerances in the driving mechanism and consequently substantially eliminate back lash in the operation of the tuning condenser and pointer by the knob 17. The driving gear 23 includes a collar or bushing member 24 rigidly secured thereto or formed integral therewith which extends into the center of an enlarged threaded nipple 26 secured to the back 10 and serving as a bearing for the collar 24 and its connected gear 23, as well as a mounting nipple for the control panel as will be hereinafter described. The collar 24 is provided with a key way 27 for receiving a spring pressed connection 28 carried by the movable pointer and reflecting unit 29, as will be hereinafter described.

In a commercial embodiment of my invention, a glass, celluloid, or similar disc 31 with indicating figures 32 appropriately stamped, etched, or printed thereon, is used as a tuning indicator dial for the apparatus. The dial has a flat front face 33, while the indicating figures 32 are imprinted on or preferably depressed into the back face 34. A plate 37 preferably of metal is painted with black or some other dead color on its front side to serve as a background for the numerals 32 distributed over the dial so that they will be clearly visible. The dial 31, shield plate 37, and driving gear 23 are assembled within a broken collar 38 riveted or otherwise secured to the back plate 10 and having a flange 39 extending forwardly slightly more than the thickness of the gear 23 as shown in Fig. 2. The plate 37 and dial 31 are mounted on the top of this flange and properly positioned by integral studs 41 extending forwardly from the flange to fit in corresponding recesses 42 in both the plate and dial. These studs also prevent rotation of the dial or the plate.

A substantially star-shaped friction washer 43 encircles a bearing stud 44 of the pointer unit 29 and not only spaces the gear 23 from the shield plate 37, but also cooperates with the front plate and dial crystal assembly, for holding this assembly tight and preventing axial movement of the gear 23 or rattling of the other members of this assembly as can be readily seen from the observation of Fig. 2.

As to the specific construction of the rotatable pointer and light reflecting unit 29, this includes a one-piece member having the hollow bearing stud 44 opening at one end toward a pilot light 46 mounted in the nipple 26, and open at the other end in an aperture 47. An integral plate 48 having a pointer portion 49 extending from one side thereof is curved over its outside or top surface in a substantially button-shape. This entire integral part is preferably molded from a suitable transparent cellulose or resinous compound, and is designed to receive the light from the lamp 46, which light passes through the transparent stud 44 to the dial 31 and into the pointer 49. The pointer 49 may be serrated along its lower surface or covered with a paint that will act to diffuse the light rays so that this pointer is particularly visible as it moves over the dial plate for tuning indication. An opaque washer 51 is held onto the back of the plate 48 by means of a closed metal cap 52 clinched over the washer and around plate portion 48 to leave the pointer protruding as shown in Figs. 2 and 3. The cap 51 preferably has an ornamental appearance emphasizing the direction of the pointer, as by being embossed as seen in Fig. 1.

The cap 52 should be large enough to obstruct all light rays from the lamp 46 which would otherwise either be seen as direct rays or as indirect rays of sufficient intensity to cause an objectionable glare. It is possible to illuminate the figures uniformly without glare, partly because the light enters at a midpoint close to all of them.

As noted above, a spring clip 28 retains the unit 29 in place and keys it to collar 24. Spring 28 is retained in the stud 44 by inwardly extending ends fitting in corresponding apertures in said stud. Oppositely disposed slots 45 at the end of the stud serve as guide slots for the spring clip. The legs of the clip 28 bulge out slightly and frictionally engage the key way 27 in the collar 24, as previously described. If desired, the shapes of clip 28 and slots 27 may be such as to urge the unit 29 inwardly.

The pilot light 46 is removably secured in a socket 53, which includes an inner and an outer cup, numbered respectively 54 and 56, with the two cups spaced apart sufficiently to permit their telescoping over and within the threaded nipple 26, which is resiliently gripped by the outer cup 56. A single contact is provided for the lamp at the end of a wire 57, with the return connection for the lamp through the metal cup and nipple to ground. The pilot lamp assembly may be provided complete and simply slipped onto the back of the nipple 26 which is secured centrally of the back plate 10 and of the dial 31.

The control panel assembly is completed with a cover 58 removably secured to the back plate 10, an annular rim 59 clinched to the plate 58 and a crystal 61 secured in the rim. The illustrations of Fig. 2 will appear in the printed patent at approximately the full size of a commercial embodiment of the invention, and the overall thinness of the complete panel is therefore readily observed. The main portion of the control panel is only approximately one-fourth inch thick when completely assembled, so that it may be mounted on the front of the dashboard of the automobile without forming an objectionable protrusion therefrom.

In order to utilize the holes or hole already provided in the instrument panel of a large number of automobiles, the control panel assembly is mounted on the instrument panel 66 of the automobile at a previously provided opening 67 by means of a substantially rectangular mounting plate 68 which is longer than the width of the aperture 67. The mounting plate is bowed slightly as indicated in Fig. 2, so as to frictionally and rigidly engage the back of the instrument panel 66, as the wing nut 69, threaded onto the nipple 26, is turned up tightly on said nipple. The person installing the control panel in the automobile can very conveniently insert his fingers behind the instrument panel to rotate the wing nut, and the rectangular mounting plate may be of such length as to surely engage the panel outside of the limits of the aperture, since such apertures of course may vary slightly in size.

In some instances apertures as 71 are already provided in the instrument panel, and when they are, or when drilled specially for the control cable 14 and nipple 11, the dial mechanism may be secured or further secured, by means of a mounting nut 72, threaded onto nipple 11.

Because of the relative inaccessibility to the back of instrument panels, for wrenches and the like, nut 72 is provided with a polygonal base 73 of the usual construction for receiving a wrench if desired, and the slotted integral flange 74 extends away from the base. A recessed shoulder 76 is provided on the inside of the flange at its connection with the base so as to be of a larger diameter than the threaded portion 77. Slots 78 are provided at intervals around the annular flange and are of a size large enough to receive the end of a screw driver. With the recessed shoulder 76 spacing the flange 74 away from the nipple 11, the end of the screw driver may extend into a slot far enough to satisfactorily turn the nut without the use of a wrench or other tool. With this combination of mounting elements, it is possible to quickly install the thin control panel on the front of the instrument panel of an automobile without objectionable cutting of the latter.

A modification of the indicating apparatus is illustrated in Fig. 4, in which the unit 29 is mounted as previously described in the supporting collar of the gear 23. In this embodiment, however, rather than having the light transmitted directly to the dial member itself, a translucent plate 81 is mounted on the collar 38 and properly spaced from the driving gear 23. This plate or block 81 is formed of glass or a cellulose or resinous compound, and has a flat front face 82 and a bevelled rear face 83, as shown in Fig. 4, and is shaped so as to provide a passageway 84 fitting over the stud 44 of the unit 29, and is of a thickness substantially that of the dial 31.

A substantially thin printed dial 86 with transparent figures and an opaque body intermediate the figures, rests on top of the plate 81. Light is transmitted through the stud of the member 29 as previously described, and passes into the plate 81 with the light rays reflecting off the bevelled surface 83 in a manner so as to cause the plate to glow over its entire body. This glow is transmitted through the transparent figures or spaces on the dial 86 to illuminate the tuning scale or any other indicating figures. The glow may sometimes be increased by roughening the back surface 83 behind the members. The pointer 49 on the member 29 is illuminated as heretofore described. This construction provides a novel as well as artistic illumination for the dial and pointer, and comprises another way to avoid the objectionable glare heretofore discussed.

Fig. 6 illustrates a further modification of the invention, in which a rotating dial 89 is provided with an integral stud 91 similar to stud 44 on the member 29, which stud is frictionally carried in the collar 24 as described in connection with the principal embodiment. Indicating figures may be imprinted on, or impressed in, the rotating dial. A dead-colored background 92 is supported in back of the dial for proper visibility of the indicating figures. In this embodiment the light from a pilot lamp 46 as shown in Fig. 2 passes through the stud 91 and out over the dial proper 89. A decorative cap 93 may be mounted as desired in the center of the dial 89 so as to assist in reflecting and diffusing the light over the entire dial. A stationary pointer 94 appropriately connected with the housing for the dial will give the proper scale reading as the dial is rotated in connection with the rotation of the tuning condenser. The fixed pointer 94 may be made readily visible in silhouette by impressing or imprinting a light diffusing ring on the periphery of the back of the rotating dial 89. The dial 89 may also be mounted behind an escutcheon plate having a viewing aperture therein, with the pointer 94 stamped integral with the plate to indicate the exact dial reading.

The last mentioned construction would be especially suitable for home radios in which there might be no special need or advantage in having the rotating parts in front of the main panel. Of course the other constructions could also be used in home radios if desired.

Although I have described my invention in its preferred embodiments, it is understood that I am not limited thereby, but limit my invention only by the scope of the appended claims.

I claim:

1. Indicating apparatus including in combination, an opaque plate member having a mounting aperture therein, a stationary dial having an indicating scale thereon mounted in front of said plate member, a light transmitting rotatable indicator movable across said indicating scale and having a light transmitting axial body portion for rotatably supporting the indicator at the mounting aperture of the plate member, a lamp adjacent said axial body portion and rearwardly of the plate member for illuminating said axial body portion, and with said axial body portion transmitting light to said indicator, means in front of the axial body portion of the indicator for preventing the undesirable projection of light directly forwardly therefrom, and driving means for rotating said indicator.

2. Indicating apparatus including a dial plate, means for illuminating said dial, an indicating pointer in front of said dial including a body portion for mounting said pointer, and means for mounting said illuminating means to project light therefrom through said body portion to said dial.

3. Indicating apparatus for a radio receiver including a dial having an indicating scale thereon, single lighting means for said dial mounted centrally and rearwardly thereof, and a combination light diffusing and scale pointing member rotatably mounted at the center of the dial with a light diffusing and scale pointing portion in front of said dial, with said dial and member illuminated by said lighting means.

4. Indicating and control apparatus for a radio receiver including in combination a stationary dial plate having an indicating scale thereon, a rotatable indicator supported centrally of the dial comprising a pointer and an integral mounting stud at right angles thereto with said indicator and mounting stud provided in light-transmitting material, means for supporting said indicator and integral stud at said stud portion, means for rotating said indicator and stud, and a lamp adjacent said mounting stud and rearwardly of the supporting means for projecting light into the mounting stud for transmission to the indicator to illuminate said indicator and dial scale.

5. Indicating apparatus panel for use on the front of a panel, including a dial and an indicator adapted to be positioned in front of said panel with said indicator movable over the front of said dial, a lamp, and means for holding said lamp behind said panel said means being in alignment with the center of said dial and indicator and permitting the light from it to enter both said dial and said indicator in front of said dial to cause them to glow substantially over the entire bodies thereof.

6. Indicating and control apparatus for mounting on the front of a panel including a relatively shallow case, a control device extending through said case and having a knob on the front side thereof, a rotatable indicator positioned in front of and close to said panel, gears positioned snugly along the back of said case, all in alignment in a single plane common to them all and parallel to the back of the case connecting said indicator and said control device, and a lamp positioned behind said panel in alignment with the axial center of said indicator and projecting light forwardly to illuminate said indicator.

7. Indicating and control apparatus for mounting on the front of a panel including an apparatus housing case, a control device extending through said case and having a knob on the front side thereof for control operation, a rotatable indicator positioned in front of and close to said panel to indicate the position of the control device, gears in a train positioned snugly along the back of said case connecting said indicator and said control device operated by said knob, with one of said gears being of such size and having rubber teeth of such size as to engage another gear in the train in a state of resilient compression to substantially eliminate lost motion in said gear train and thus provide an accurate operation of the indicator with relation to the movement of said control knob.

8. Indicating and control apparatus for mounting on front of a panel including a relatively shallow case, a control device extending through said case and having a knob on the front side thereof, a rotatable indicator positioned in said case, gears positioned snugly along the back of said case connecting said indicator and said control device, and a lamp positioned behind said panel and illuminating said indicator, said case having a nipple extending rearwardly therefrom and passing through a hole in said panel and attachment means secured on said nipple and bearing against the back of said panel for securing said apparatus thereto.

9. Indicating and control apparatus for mounting on the front of a panel including a case, a control device extending through said case and having a knob on the front side of the case, a rotatable indicator positioned in said case, means drivingly connecting said indicator and said control device, said case having a nipple extending rearwardly therefrom and passing through a hole in said panel and attachment means secured on said nipple, including a relatively large plate, bearing against the back of said panel for securing said apparatus thereto.

10. Indicating and control apparatus for mounting on the front of a panel including a relatively shallow case, having a nipple extending rearwardly therefrom and passing through a hole in said panel and attachment means secured on said nipple and bearing against the back of said panel for securing said apparatus thereto, a control device extending through said case and having a knob on the front side thereof, a rotatable indicator positioned in front of and close to said panel, gears positioned snugly along the back of said case, connecting said indicator and said control device, and a lamp positioned behind said panel and shining through said nipple to illuminate said indicator.

11. Indicating and control apparatus including a control member and an indicating member, and means for drivingly connecting said members including a pair of gears, one of which has rubber teeth of such size and so positioned as to engage the teeth of the other gear in a state of resilient compression, whereby backlash between said gears is eliminated.

12. Indicating apparatus including an indicator dial of light transmitting material having indications in connection therewith and arranged about the center point of the dial, indicator means for said indications, a light source rearwardly from the center of the dial, means providing a light carrying channel from said rearward source into said dial in a zone approximately at said center point, with said light spreading out in said dial for illuminating said indications with relative uniformity, and an opaque shield at the end of the channel for obstructing from the observer such light rays as would be of sufficient intensity to cause an objectionable glare.

13. Indicating and control apparatus supported upon one side of a mounting panel, an illuminating lamp for said apparatus mounted behind the panel with the light rays therefrom passing through a relatively small hole in the panel, said apparatus including a dial, a central formation for said dial including a light transmitting stud extending rearwardly therefrom adapted to receive said light and pass it outwardly in radial directions therefrom in said dial and indications on said dial arranged around said central formation.

14. Control and indicating apparatus for a controllable device including a mounting plate, an elongated bushing secured to said plate and extending to one side thereof, a driven gear having a bushing rigid thereon journalled in said elongated bushing with the gear rotatable on the opposite side of said plate, a dial unit having indicating figures, with said unit supported in front of said gear and with the centers of each in alignment, a light source for the apparatus in said elongated bushing, light transmitting means for the dial unit including a light transmitting stud keyed in the gear bushing and rotatable therewith extending toward the dial out of the elongated light source bushing, control means in driving connection with the driven gear, and indicating means for the dial.

15. Indicating apparatus including in combination, an opaque plate member having a mounting aperture therein, rotatable indicating means having an axial mounting portion with a light transmitting body rotatably supported in the mounting aperture in the plate member, a stationary light supported rearwardly of the opaque plate member adjacent the axial mounting portion for projecting rays of light into the body of said axial mounting portion for transmission to the rotatable indicating means to light the same, opaque means in front of the axial mounting portion for preventing the projection of light rays directly forwardly therefrom, and means for driving said rotatable indicating means.

16. Indicating and control apparatus for a radio receiver including in combination a rotatable indicator unit including an integral mounting stud serving as an axis therefor with said unit being of light transmitting material, a driven mounting bushing for said unit with said mounting stud keyed therein against rotation with respect thereto, means for driving said mounting bushing, a stationary support for said mounting bushing, a stationary lamp carried rearwardly of the indicator unit for projecting light into said mounting stud for transmission to said indicator, and means for preventing light rays from projecting directly forwardly out of said indicator unit from said mounting stud but causing said light to diffuse through said indicator.

17. An indicating device including in combination a dial scale visible to an operator in front of said device, an illuminating lamp rearwardly of the dial scale, and means for illuminating said scale from said lamp and indicating a particular position thereon, said means including a rotatable assembly comprising a member having a bore therein rotatably supported rearwardly of the dial scale, means in said member at the bore thereof and rotatable therewith for passing light from said illuminating lamp forwardly to illuminate the dial scale, an illuminated indicator portion in front of said light-passing means rotatable with said means and movable across said dial scale, and means rotatable with said light-passing means for diffusing over said dial scale light originating from said illuminating lamp and passing through said light-passing means, with said indicator portion being illuminated from light from said lamp to make it visible in its movement over said scale, and means for rotating said assembly.

18. An indicating device for a radio receiver including in combination a frame, a dial scale at the front of said frame, an illuminating lamp supported on said frame rearwardly of said dial scale and substantially centrally thereof, a unit acting for transmitting and diffusing light and for tuning indication rotatably supported in said frame in front of said illuminating lamp, said unit comprising a rotatable hollow member journalled in said frame, a light transmitting portion in said hollow member supported therein against rotation relative thereto for transmitting light from said lamp, an illuminated indicator portion on said light transmitting portion and rotatable therewith, and an opaque portion for said unit rotatable therewith for preventing the projection of light directly forwardly from said light transmitting portion of said device and causing the diffusion of said light over the dial scale and indicator portion to make the latter visible in its movement over the scale, and means for rotating said unit in said frame.

19. An indicating and control device for a radio receiver including a frame, a stationary sleeve extending rearwardly from said frame, a dial on said frame supported forwardly of said sleeve with the center of said dial corresponding with the longitudinal axis of said sleeve, a stationary illuminating lamp supported at the rear end of said sleeve, means for transmitting light to said dial from said lamp including a member having a central bore journalled in said sleeve, a light transmitting body supported on said member at said bore and non-rotatable relative to said member, indicating means forwardly of said body supported therefrom and rotatable therewith, said indicating means being illuminated by light from said lamp to be visible in its movement across said dial, opaque means in front of said light transmitting body and rotatable therewith for diffusing over said dial light from said lamp passing through said light transmitting body, and rotatable control means on said frame connected with said member for rotating said member and obtain an indication of the relative position of said control means.

DONALD H. MITCHELL.